June 10, 1958 M. J. SCHLITTERS 2,837,941
RECESSING TOOL HOLDER
Filed March 27, 1957 3 Sheets-Sheet 1

INVENTOR.
MICHAEL J. SCHLITTERS
BY
J. S. Murray
ATTORNEY

INVENTOR.
MICHAEL J. SCHLITTERS
BY J.S. Murray
ATTORNEY

2,837,941
RECESSING TOOL HOLDER

Michael J. Schlitters, Detroit, Mich.

Application March 27, 1957, Serial No. 648,891

7 Claims. (Cl. 77—58)

This invention relates to recessing tool holders and particularly such holders as are applicable to screw machines.

The invention may be considered as an improvement on the subject matter of my Patent 2,495,291, issued Jan. 24, 1950.

Disclosed in said issued patent is a holder comprising a lower member mounted on a slide serving to feed the holder to a work-piece. Surmounting said member is a tool-receiving upper member presenting an inclined bottom cam face to a similar top face of the lower member, whereby the upper member, upon encountering a stop, will be gradually raised by a relative camming action of the two inclined faces. Thus a cutting tool fixed on the upper member will take a recessing cut within a bore or other opening of the work-piece. In the patented construction, the recessing travel of the tool, both in cutting and withdrawing is exactly normal to travel of the slide, and hence the tool, in the course of its retraction, exerts considerable pressure on the newly cut radial face of the work-piece, slightly scoring such face. For the purpose of many types of work, such scoring is objectionable.

An object of the invention is to impose on the tool a slight retractive travel along the axis of the work-piece as a recess is cut, and a slight advance along said axis as the tool is withdrawn from such recess, so as to slightly clear the radial wall of the recess during withdrawal, thus avoiding scoring.

Another object is to adapt an end wall of a recess formed within a bore of a work-piece to be readily undercut slightly, if this is desired.

Another object is to employ an abutment on a stop rod to encounter the upper of the aforementioned two members forming a tool holder, and to avoid swinging of said rod about its anchored rear end, as the upper member is raised by camming coaction with the lower member.

Another object is to provide two members, one supported on the other, the supporting member being fixed on a slide and fed by such slide to and from a work-piece, and the supported member carrying a recessing tool, said members having interengaged cam faces to actuate the supported member and tool transversely to the slide travel upon subjecting the supported member to a stop, such transverse actuation being employed to subject the supported member to another camming device, whereby the tool cuts in a direction slightly diverging from a rectangular relation to travel of the slide, with consequent clearance of the tool from an end of the cut recess during withdrawal of the tool.

These and various other objects are attained by the construction hereinafter described and illustrated in the accompanying drawings, wherein.

Figure 1:
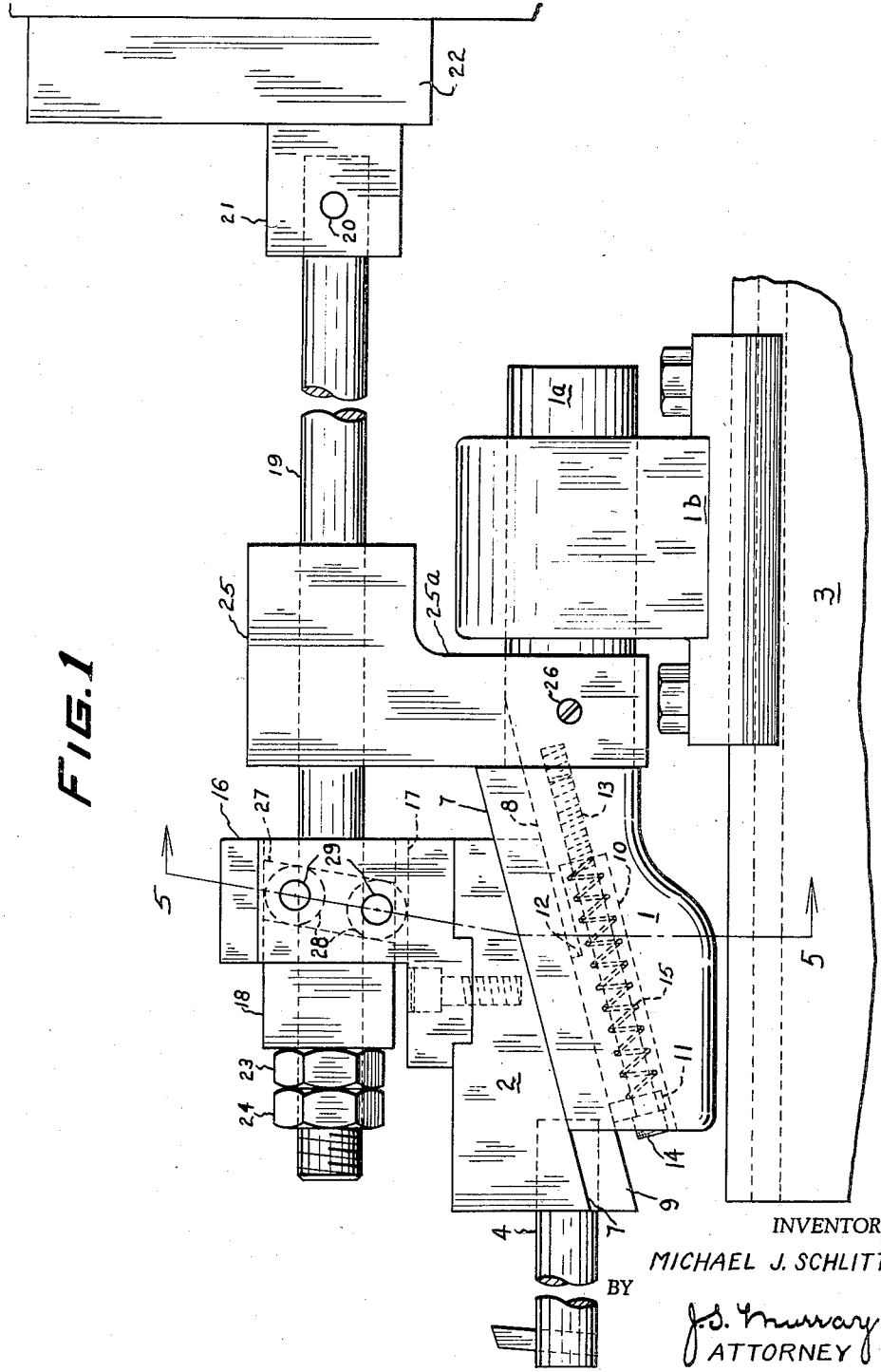
Fig. 1 is a view of the tool holder in side elevation showing a cutter carried by the holder and partially showing a slide for advancing and retracting the holder.
Figure 2:
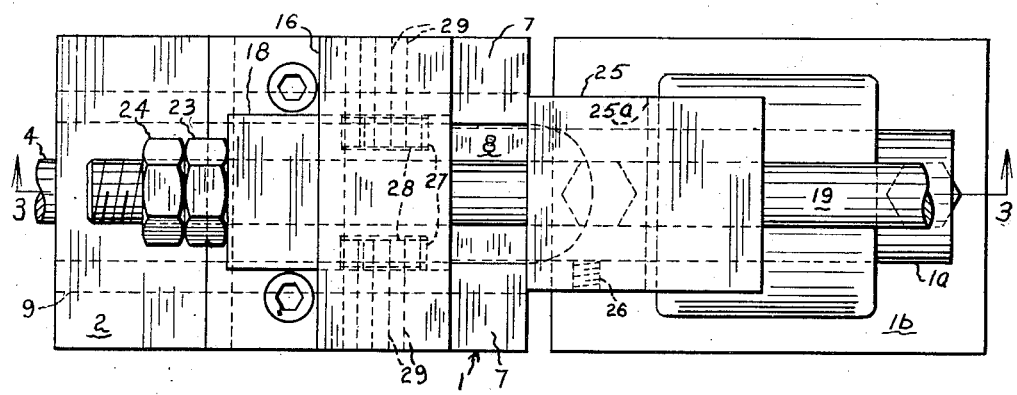
Fig. 2 is a top plan view of the holder.
Figure 3:
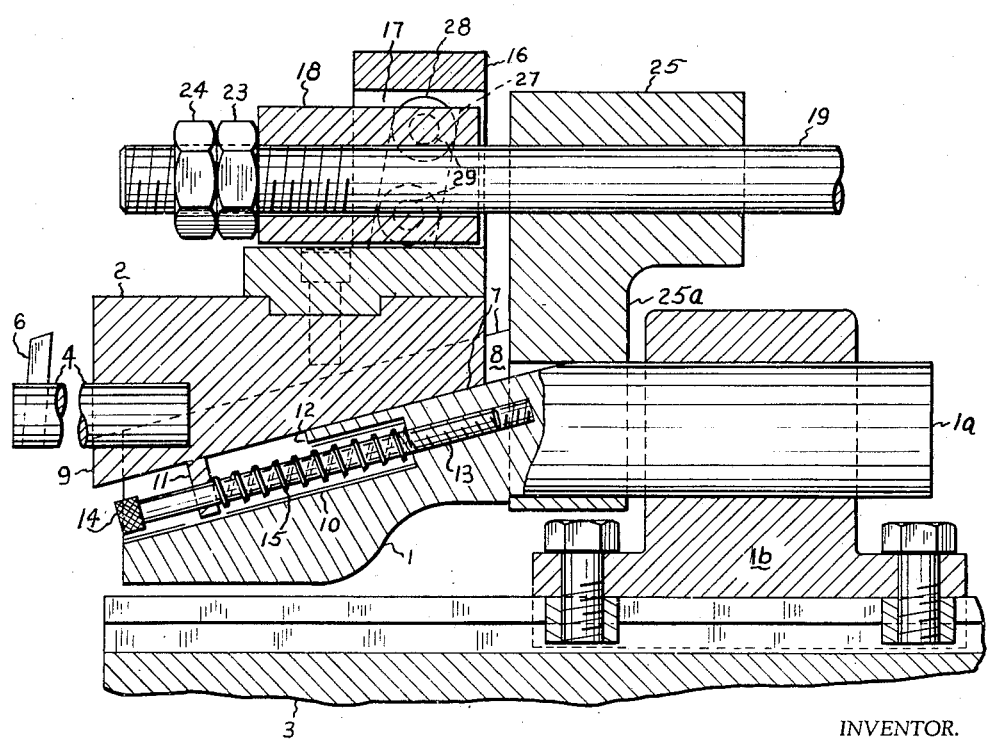
Fig. 3 shows the holder in longitudinal vertical section, as per the line 3—3 of Fig. 2.
Figure 4:
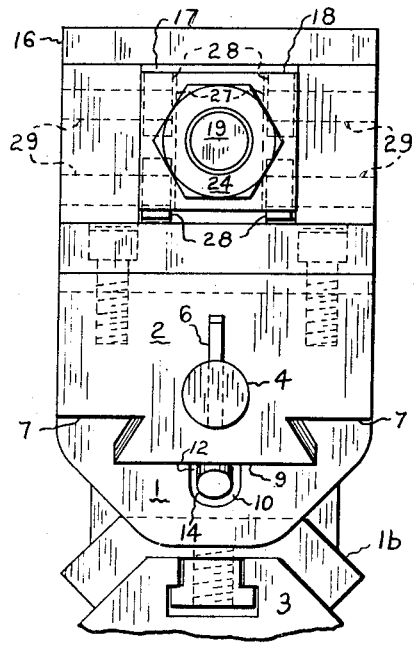
Fig. 4 is a front view of the holder.
Figure 5:
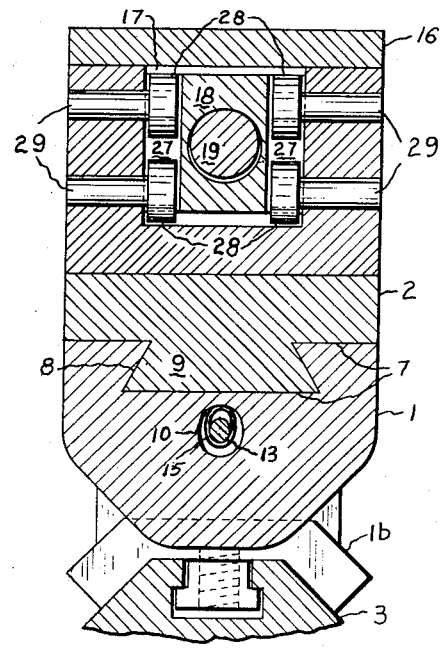
Fig. 5 is a vertical cross sectional view, taken on the line 5—5 of Fig. 1.

In these views, the reference characters 1 and 2 respectively designate a supporting and a supported member, the former driving the latter and also guiding it in a sliding travel. The supporting member is rigidly carried by a rearwardly projecting shank 1a, fixed in a bracket 1b, having the usual rigid mounting on the center slide 3 of a screw machine.

Figure 7:
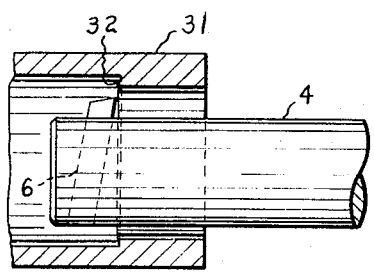
Figs. 6 and 7 are axial sectional views of work-pieces as recessed by a tool mounted in the holder.
Figure 6:
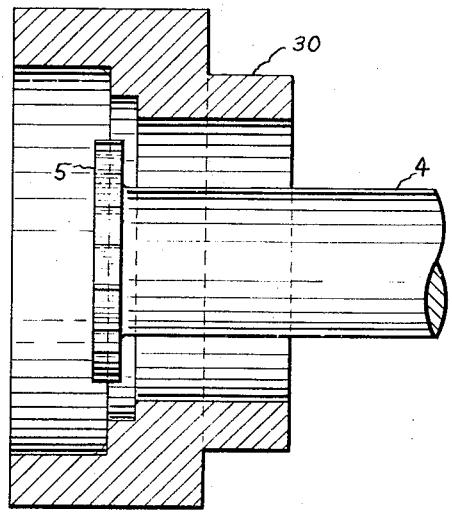

The supported member has set into its forward end the shank 4 of a recessing tool, such as shown at 5 in Fig. 6, or at 6 in Fig. 7.

The members 1 and 2 have interengaging plane cam faces 7, seating and supporting the member 2 on the member 1, such faces upwardly and rearwardly diverging from the direction of advance and retraction of the slide 3 at an angle preferably approximately fifteen degrees. The face 7 of the supporting member is longitudinally and centrally formed with a groove 8 having its opposed walls undercut to mate with a dove-tailed tongue 9 carried by and beneath the supported member, the two members being thus retained in assembly, and the supported member being afforded an accurate sliding along the cam faces 7.

Extending rearwardly in the supporting member from its front end is a bore 10 parallel and adjacent to the faces 7, and a lug 11 on the supported member projects into such bore, the forward portion of the latter being cut through to the groove bottom, as indicated at 12, to allow forward and back travel of the lug as the member 2 slides on the member 1. Extending freely through the bore 10 and lug 11 is an elongated screw 13 threaded into the member 1 rearwardly of the bore and formed on its front end with a head 14 as a stop for engagement by the lug 11. Coiled on said screw and compressed between said lug and the rear end of the bore is a spring 15 urging the member 2 forward with considerable force, response of such member being limited by the head 14.

Rigidly surmounting the member 2 is a bracket 16 having a rectangular chamber 17 opening in its front and rear faces. Slidable forward and back in such chamber is a block 18 slip-fitted to the side walls of the chamber, while affording the bracket a predetermined required up and down travel relative to such block. Extending centrally and slidably through the chamber 17 is the front end portion of an elongated stop rod 19 having its rear end secured by a pin 20 to a support 21 fixed on a portion 22 of a screw machine frame. Threaded on the forward end of the rod 19 is a nut 23, serving as an abutment limiting forward travel of the block 18. A second nut 24 is set against the nut 23 to lock the latter in place. Rearwardly spaced from the bracket 16 is a slide bearing 25 having an integral downwardly extending arm 25a secured upon the shank 1a by a set-screw 26. Thus the rod 19 is maintained in its intended horizontal position of use, while affording the requisite forward and back travel of the tool holder.

Oppositely formed in the side faces of the block 18 is a pair of duplicate grooves 27 extending from top to bottom of the block with a forward inclination, as best appears in Fig. 1. Rotatively fitted in each such groove is a pair of spaced rollers 28, each journaled on a pin 29. The several pins are fixed in the bracket 16 and project into and locate the rollers in the chamber 17.

In use of the described tool holder, the same is fed forwardly by the slide 3 until the cutter 5 or 6 enters the bore or other opening of a rotating piece of work 30 or 31 to be recessed by such cutter. When the cutter has been advanced to its predetermined cutting position, the block 18, which has heretofore been riding forward along the rod 19, encounters the stop nut 23 and is thus restrained from further advance. As the supporting member 1 continues its advance, the spring 15 is progressively compressed and the member 2 is cammed upwardly to first engage the cutter with the wall of the bore and then feed the cutter into such wall, the depth of cut being determined by the extent of camming reaction between the members 1 and 2. During initial retraction of the member 1 after a recessing operation, the member 2 maintains its established advanced position, compression of the spring 15 being progressively relieved, and the member 2 progressively shifting downwardly due to relative sliding of the faces 7, whereby the cutter is withdrawn from the completed recess.

Essentially differing from the patented construction, the tool holder now disclosed does not merely feed the cutter to or withdraw it from the work in a direction transverse to advance or retraction of the holder. As the member 4 and the cutter carried by such member are upwardly cammed by the faces 7, they are subjected to a considerably less rearward travel due to the camming effect exerted on the rollers 28 by the grooves 27. The motion resultant from the described upward and rearward actuation of the cutter is rectilinear and in a direction diverging at least a few degrees rearwardly from a plane normal to the shank 4 of the cutter. If the cutter is of the type shown in Fig. 6, having a radial as well as a peripheral cutting edge, the recess will be formed with a ninety degree angle, and the withdrawal of the cutter will be along a diagonal of such angle, so as to clear the newly cut faces of the recess and thus avoid the frictional resistance and scoring tendency that would arise if the cutter moved in and out as in the aforementioned patent in a direction transverse to the cutter shank.

By employing a cutter of the type shown in Fig. 7, with the cutter length diverged from a plane normal to the shank 4 as said length extends from the cutting edge, the recess in the work may be formed with an undercut end wall as indicated at 32.

It will be noted that the block 18 exercises a dual function in the described construction, forming an abutment to engage the stop nut 23 and also having the grooves 27 which coact with the rollers 28 to derive a rearward component from the upward travel imposed for recessing purposes on the bracket 16, member 2, and cutter 5 or 6.

What I claim is:

1. A recessing tool holder comprising a supporting and a supported member, means for guiding the supporting member in a rectilinear advance toward and retraction from the work, said members having contiguous substantially plane cam faces acutely divergent to said advance and retraction, means for interconnecting said members and guiding them in a relative travel along said cam faces in the direction of said divergency, means for installing a cutter on the supported member, a spring reacting between the two members and uring the supported member toward the work, coacting elements on said members for limiting response of the supported member to the spring, means on the supported member for engaging a stop during said advance of the tool holder and thus limiting advance of the supported member, whereby said cam faces take effect to feed the supported member transversely to said rectilinear advance, and coacting means on said supported member and stop-engaging means for camming the supported member in the direction of said rectilinear retraction, responsive to said transverse feeding of such member.

2. A recessing tool holder comprising a supporting and a supported member, means for guiding the supporting member in a rectilinear advance toward and retraction from the work, said members having contiguous substantially plane cam faces acutely divergent to said advance and retraction, means for interconnecting said members and guiding them in a relative travel along said cam faces in the direction of said divergency, means for installing a cutter on the supported member, a spring reacting between the two members and urging the supported member toward the work, coacting elements on said members for limiting response of the supported member to the spring, means on the supported member for engaging a stop during said advance of the tool holder and thus limiting advance of the supported member, said stop-engaging means including a bracket fixed on the supported member and projecting from such member in a direction substantially transverse to said rectilinear advance and retraction, a stop-abutting block coacting with such bracket, and coacting means on the block and bracket for camming the supported member retractively responsive to said transverse feeding of such member.

3. A recessing tool holder as set forth in claim 2, said camming means including a groove formed in said block extending at an acute divergency to the direction of said transverse feeding of the supported member, and a roller journaled on said bracket and operatively disposed in said groove.

4. A recessing tool holder as set forth in claim 2, said block having a portion disposed within the bracket and formed with opposed cam grooves extending at an acute divergency to the direction of said transverse feeding of the supported member, and elements on the bracket and engaged in said grooves for feeding the supported member in its retractive direction responsive to said transverse feeding of such member.

5. A recessing tool holder as set forth in claim 2, said block having a portion disposed within the bracket and formed with opposed cam grooves extending at an acute divergency to the direction of said transverse feeding of the supported member, and a pair of rollers operatively occupying each of said grooves and journaled on said bracket for feeding the supported member in its retractive direction responsive to said transverse feeding of such member.

6. A recessing tool holder as set forth in claim 2, said block being apertured to afford it a sliding fit on a rod carrying said stop, a bearing wherein said rod is slidable and means rigidly mounting such bearing on the supporting member.

7. In a recessing tool holder as set forth in claim 2, said block being apertured to afford it a sliding fit on a rod carrying said stop, means for maintaining said rod in parallelism to said rectilinear advance toward and retraction from the work.

References Cited in the file of this patent
UNITED STATES PATENTS

| | | |
|---|---|---|
| 1,928,529 | Gerrard | Sept. 26, 1933 |
| 2,495,291 | Schlitters | Jan. 24, 1950 |